(12) United States Patent
Farivar et al.

(10) Patent No.: US 12,124,844 B2
(45) Date of Patent: Oct. 22, 2024

(54) METHODS AND ARRANGEMENTS TO PROCESS COMMENTS

(71) Applicant: Capital One Services, LLC, McLean, VA (US)

(72) Inventors: Reza Farivar, Champaign, IL (US); Kenneth Taylor, Champaign, IL (US); Austin Grant Walters, Savoy, IL (US); Fardin Abdi Taghi Abad, Champaign, IL (US); Anh Truong, Champaign, IL (US); Vincent Pham, Champaign, IL (US); Jeremy Edward Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/207,305

(22) Filed: Jun. 8, 2023

(65) Prior Publication Data
US 2023/0325182 A1    Oct. 12, 2023

Related U.S. Application Data

(63) Continuation of application No. 17/490,819, filed on Sep. 30, 2021, now Pat. No. 11,714,636, which is a
(Continued)

(51) Int. Cl.
*G06F 8/73* (2018.01)
*G06F 8/33* (2018.01)
(Continued)

(52) U.S. Cl.
CPC ............... *G06F 8/73* (2013.01); *G06F 8/33* (2013.01); *G06F 8/41* (2013.01); *G06F 8/77* (2013.01);
(Continued)

(58) Field of Classification Search
CPC ..... G06F 8/33; G06F 8/41; G06F 8/73; G06F 8/77; G06F 40/30; G06F 40/169;
(Continued)

(56) References Cited

U.S. PATENT DOCUMENTS 9,032,289 B1    5/2015    Cierniak et al.
9,733,933 B1 *  8/2017    Arquero ................... G06F 8/33
(Continued)

OTHER PUBLICATIONS

Rahman, Mohammad Masudur, et al., Recommending insightful comments for source code using crowdsourced knowledge, IEEE 15th International Working Conference on Source Code Analysis and Manipulation, Sep. 2015, 10 pages, [retrieved on Apr. 19, 2024], Retrieved from the Internet: <URL:http://ieeexplore.ieee.org/>.*

(Continued)

*Primary Examiner* — Geoffrey R St Leger
(74) *Attorney, Agent, or Firm* — KDW Firm PLLC

(57) ABSTRACT

Described herein are embodiments for managing comments in a program code file. A system may select program code and compile it to an intermediary code. The system may compare the intermediary code to a library of intermediary code snippets associated with comments. Based on the comparison, a system may recognize the code to be obsolete. In some embodiments, a system may generate one or more recommendations to update a code. Based on received feedback regarding a recommendation, a system may accordingly update a code.

20 Claims, 9 Drawing Sheets

Related U.S. Application Data continuation of application No. 16/844,084, filed on Apr. 9, 2020, now Pat. No. 11,163,560.

(51) Int. Cl.
*G06F 8/41* (2018.01)
*G06F 8/77* (2018.01)
*G06F 40/30* (2020.01)
*G06N 3/08* (2023.01)
*G06N 5/04* (2023.01)
*G06N 20/00* (2019.01)

(52) U.S. Cl.
CPC ............... *G06F 40/30* (2020.01); *G06N 3/08* (2013.01); *G06N 5/04* (2013.01); *G06N 20/00* (2019.01)

(58) Field of Classification Search
CPC ............ G06N 3/045; G06N 3/08; G06N 5/04; G06N 20/00
See application file for complete search history.

(56) References Cited

U.S. PATENT DOCUMENTS

| | | |
|---|---|---|
| 11,720,741 B2 | 8/2023 | Nelson et al. |
| 2013/0074001 A1 | 3/2013 | Meriman et al. |
| 2013/0117206 A1 | 5/2013 | Craig et al. |
| 2016/0266896 A1* | 9/2016 | Fan .......................... G06F 11/36 |
| 2017/0305589 A1 | 10/2017 | Yuyama et al. |
| 2019/0347281 A1 | 11/2019 | Natterer |
| 2020/0012639 A1 | 1/2020 | Liu et al. |
| 2021/0081182 A1 | 3/2021 | Seshadri et al. |
| 2021/0255852 A1 | 8/2021 | Nakaike |

OTHER PUBLICATIONS

Ciurumelea, Adelina, et al., Suggesting Comment Completions for Python using Neural Language Models, IEEE 27th International Conference on Software Analysis, Evolution and Reengineering (SANER), Feb. 2020, 12 pages, [retrieved on Apr. 19, 2024], Retrieved from the Internet: <URL:http://ieeexplore.ieee.org/>.*

* cited by examiner

300

700

800

METHODS AND ARRANGEMENTS TO PROCESS COMMENTS

CROSS-REFERENCE TO RELATED APPLICATIONS

This application is a continuation of U.S. patent application Ser. No. 17/490,819, entitled "METHODS AND ARRANGEMENTS TO PROCESS COMMENTS" filed on Sep. 30, 2021 and U.S. patent application Ser. No. 16/844,084, entitled "METHODS AND ARRANGEMENTS TO PROCESS COMMENTS" filed on Apr. 9, 2020, now U.S. Pat. No. 11,163,560. The contents of the aforementioned applications are incorporated herein by reference in its entirety.

BACKGROUND

Programmers may create notes about code in the form of comments. Details in code comments may improve human understanding of code, such as by explaining context related to the code or how the code works. Code comments may include pseudo-code, natural language, or formatting that is ignored by code compilers. Some tools may analyze a programmer's code and generate comments automatically. Some tools may gather comments from a code and create documentation about the code from the comments.

BRIEF DESCRIPTION OF THE DRAWINGS

FIGS. 6-8 is a block diagram depicting an exemplary computer such as a server, data storage device, or client device.

DETAILED DESCRIPTION OF EMBODIMENTS

Figure 1A:
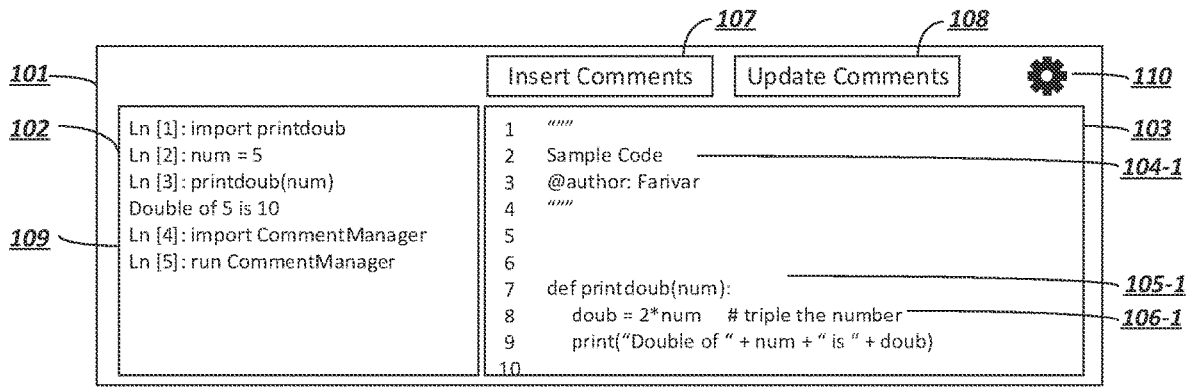
FIGS. 1A-C depict exemplary user interfaces relating to the management of code comments.

Programmers may use comments in code to keep clear records of the context of a code and/or how the code works. However, each time the code is changed, the comments may become outdated. The programmer may need to manually review the code for outdated comments and update them to match changes to the code. A code review may be a tedious and/or slow process, and programmers may be discouraged from properly updating code comments. In some cases, codes may be managed across platforms and coding languages. Keeping comments updated, then, may require a high level of skill that not all programmers possess. Even if a programmer tries to update comments, the code may be complex. The programmer may make mistakes. In any of these cases, the resulting mismatch between comments and code may be confusing and/or misleading.

Aspects disclosed herein provide solutions for one or more of the preceding weaknesses. A system may select program code and compile it to an intermediate language code. An intermediate stage code may be code compiled in an intermediate stage, for example, between program language and computer language. The system may compare the intermediate language code to a library of intermediate language code snippets associated with comments. Using the intermediate language code may enable the system to easily adapt to codes based on different platforms and/or languages.

Based on the comparison, the system may select one or more candidate comments as potentially being relevant to the selected program code. The system may present the comments as options to a user and receive feedback for the options. Based on the feedback, the system may insert the comments into the program code. The comments may be inserted into the code in accordance with the platform and/or language of the original program code.

In some cases, the system may compare the intermediate language code to code snippets in the library by checking for an exact match, calculating a Levenstein distance, or using a model. A model may be based on code from an internal code bank or on an external code bank, such as a third-party and/or open source code bank.

In some cases, the system may determine that a comment previously associated with a program code does not match determined candidate comments. Thus, the system may determine that a program's code is outdated and/or obsolete. The system may present options to a user for new comments, and, based on receiving user feedback, replace the obsolete comments with updated comments.

Accordingly, one or more advantages may be provided. Basing comment analysis on code compiled to an intermediary stage may enable systems to analyze code from a variety sources and/or source languages. An embodiment may make recommendations of comment updates for a code segment based on analysis of code from a plurality of sources and/or source languages, increasing likelihood of the relevance of recommendations. Presentation of, reception of selection of, and/or integration of recommendations may decrease the time and/or steps required for a programmer to maintain up-to-date comments in a code, increasing the relevancy and/or readability of code.

Computers may thus be enabled by embodiments described herein to manage comments in code via new methods, for example, by analysis of code compiled to an intermediary stage. Computers may be enabled in a practical application to determine recommendations for comment updates in a code based on code segments from a plurality of code sources and/or languages. Accordingly, additional and useful functionality may be added to one or more computer devices by embodiments described herein.

In many embodiments, one or more of the components described herein may be implemented as a set of rules that improve computer-related technology by allowing a function not previously performable by a computer that enables an improved technological result to be achieved. For example, automatically detecting an obsolete comment in a code and/or providing comment recommendations for a code may be improved technological results. In further examples, automatic selection may be an improved technological result, and/or integration of a comment recommendation automatically or based on a selection of the recommendation may be an improved technological result.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations integrated in practical applications, e.g., to identify useful comments for intermediate code segments and/or to identify and/or replace obsolete comments associated with intermediate code segments.

Useful machines for performing operations of various embodiments may include general purpose digital computers as selectively activated or configured by a computer program stored within that is written in accordance with the teachings herein to form specific purpose machines, which may or may not include apparatuses, such as application specific integrated circuits (ASICs), specially constructed to implement embodiments described herein. Various embodiments also relate to apparatus or systems for performing these operations in a practical application to accomplish specific results or intermediate operations related to obtaining specific results. These apparatuses may be specially constructed to implement embodiments described herein. The required structure(s) for a variety of these machines to implement embodiments described herein will be apparent from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. Embodiments are not limited in this context.

Figure 1B:
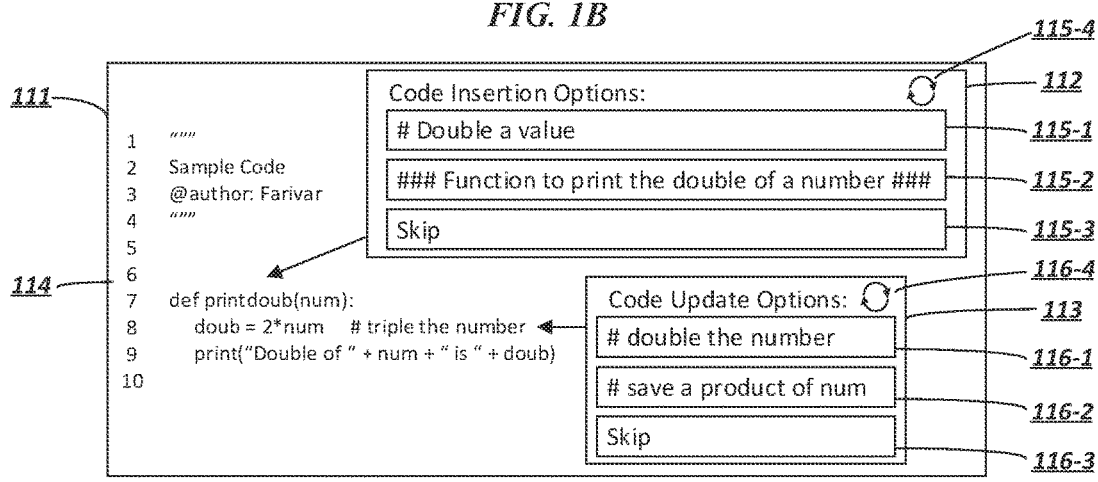
Figure 1C:
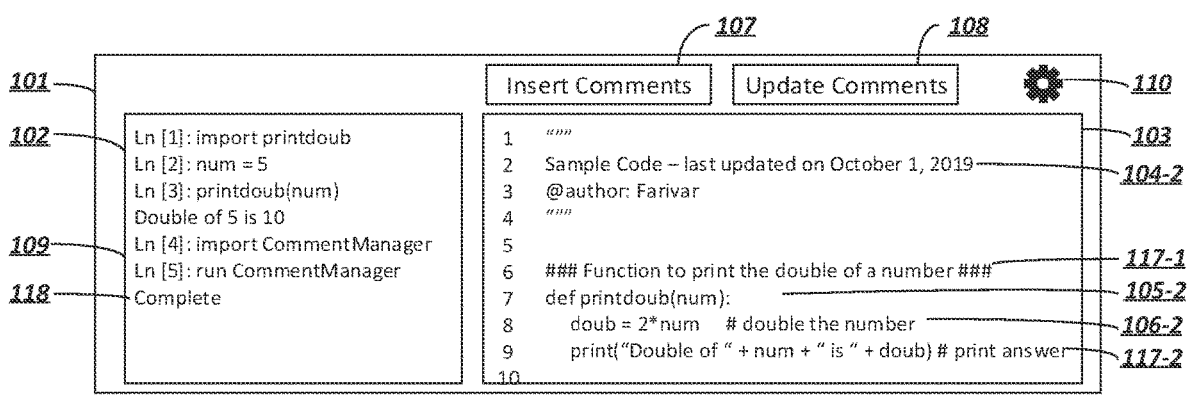

FIG. 1A-C illustrate exemplary user interfaces according to one or more embodiments described herein. Embodiments are not limited in this context.

A system may generate a graphical user interface (GUI) associated with the input of text in one or more languages. In some embodiments, a GUI may be presented via a processor with an integrated display driver or a processor coupled with a display driver and via a display device. The display device, such as a screen or monitor, may couple to a computing device containing logic circuitry of a comment manager system. In many embodiments, a GUI may include an integrated development environment (IDE). The IDE may contain at least one of a code editor, a debugger, a compiler, or a comment manager. Via the comment manager, the IDE may be configured to remove obsolete comments from a code, insert new comments in a code, and/or update comments in a code. Logic circuitry may refer to the hardware or the hardware and code that implements one or more logical functions, as described herein.

For the sake of simplicity, the present description will refer to examples of input text being programming code and the respective language being a programming language. However, it will be appreciated that embodiments may be applied to input text comprising natural language, or another text form, and that languages may comprise natural languages, machine languages, or other known languages.

FIG. 1A illustrates an exemplary GUI in the form of user interface 101. In some embodiments, a user interface 101 may be associated with a comment manager system. A user interface 101 may include a programming environment. In many embodiments, a programming environment may comprise an IDE for input of commands to process a code, such as runtime environment 102. For example, runtime environment 102 is illustrated as including received commands to import a function "printdoub," save a variable "num" as 5, and run the function printdoub on the num variable. Commands may be processed based on received input, for example. In some cases, a runtime environment 102 may receive code and/or text to analyze for comment content. In some embodiments, the user interface 101 may receive text and/or commands exclusively through a runtime environment 102. In some embodiments, a user interface 101 may additionally, or alternatively, receive text and/or code in a separate workspace, such as workspace 103.

As illustrated with respect to workspace 103, code may include text designated as comments. Comments may be parts of code written to help a user determine the context and/or function of a code or a part of a code. Comments may pertain to a code related to a file, such as a header comment 104-1 (in lines 1 through 4 of the illustrated code), to a code section such as code section 105-1 (for example, lines 7-9 of the code), or to a code segment, such as comment 106-1 (line 8 of the code).

However, code may lack comments relating to a part of a code, or comments may be outdated. For example, code section 105-1 may be missing a comment, and comment 106-1 may be outdated, obsolete, and/or otherwise incorrect.

One or more embodiments may insert and/or update comments relating to a code. An instruction to begin analysis of a code and/or comment may be received via a button on a user interface, such as via Insert Comments button 107 and/or Update Comments button 108, or via an entered text command, such as commands 109 (for example, lines 4-5 in runtime environment 102). Various command entry points, such as buttons 107 and 108 and runtime environment 102, may be used to access the same or different functionality of a comment manager. For example, an Update Comments button 108 may be used to receive an instruction including an updating of outdated comments in addition to inserting new and/or deleting old comments, or the functionality may be limited to updating text in existing comments. Aspects are illustrated in FIG. 1A by way of example and do not limit this context.

Specifically, embodiments may compile a code or a part of a code to an intermediate language. If a text is not a code, systems may otherwise compile a text and/or file to an intermediate language interpretation. The compiled intermediate code may be compared to intermediate code segments in a library, wherein the intermediate code segments are associated with comments. A library may include intermediate code segments from a local databank, from user entry, or for an external coupled database. For example, a library may include code derived from an open-source platform managed by a third party. Sources included in a library may be set as a default or adjusted through a user interface, such as via a settings selection menu 110.

Based on the comparison, comments associated with the compiled intermediate code may be compared to the comments associated with the library intermediate code segments. Based on one or both of the code comparison and comment comparison, embodiments may generate recommended updates to comments associated with the original program code.

Recommended updates to comments may be displayed via a user interface, such as user interface 111 of FIG. 1B. A user interface 111 may include some, all, or none of the characteristics of a user interface 101. For example, a user interface may be a user interface 101, a separate page, a pop-up view, or other display.

One or more recommendation menus, such as code insertion options menu 112 and code update options menu 113, may be displayed on a user interface 111. Recommendation menus may be displayed in association with all or part of a program code, such as code 114. For example, recommendation menus may be associated with code via arrows, highlighting, or other indicators of a code section or location within a code, with a display of a code preview in the recommendation menu, or other method of visualizing the connection. Recommendation menus may be displayed concurrently for different parts of code or concurrently. For example, a recommendation menu many be presented with relation to one identified issue, and when a response is received to resolve the issue, the recommendation menu may be updated and/or replaced by another for a subsequent issue. In some embodiments, multiple identified issues may be presented together in a single recommendation menu.

Recommendation menus may display one or more recommendations to update comments based on a code and/or comment analysis. For example, code insertion options menu 112 includes recommendations 115-1, 115-2, and 115-3, and code update options menu 113 includes recommendations 116-1, 116-2, and 116-3. Recommendations may include comments of various formats or the same format. For example, recommendation 115-1 may be a comment formatted to annotate a single line or minor component of a code, whereas recommendation 115-2 may be an option formatted to enable recognition of a distinct section in the code. Recommendations may include an option to forego any of the options, such as in recommendations 115-3 and 116-3. A user interface 111 may receive instructions to present alternative and/or recalculated recommendations via a recommendation option, such as via refresh buttons 115-4 and 116-4.

Recommendation menus may receive indications of selection of one or more options via a selection of a displayed recommendation, such as by a clickable button, a dropdown menu, a checkbox, or other selection method. Based on the received indication(s), embodiments may update one or more comments of a program code, as illustrated in FIG. 1C. Updating a comment may include inserting a comment and/or deleting a comment. The update of a comment may occur in real-time, near real-time, or after a number of instructions have been received via recommendation menus. For example, updates may not be made to a code's comments until some or all identified issues have been resolved via recommendation selections.

In some embodiments, comments may be updated without a received selection. For example, embodiments may update one or more comments automatically according to the most-likely recommendation option. In some embodiments, comments may be updated automatically based on the update being designated a non-substantive and/or bibliographic update. For example, embodiments may update a header comment with details about recent activity relating to the code and/or comments, such as in header comment 104-2.

Additionally, or alternatively, comments may be updated based on received feedback. For example, a portion of code 105-1 may have been identified by a comment manager as lacking a descriptive comment. A code insertion options menu 112 may have been accordingly presented, and a selection of recommendation 115-2 received. Based on the receipt of the selection, a comment manager may insert comment 117-1. The formatting of comment 117-1 may indicate portion of code 105-1 as a defined section of the code 105-2.

In another example, a code manager may recognize comment 106-1 as being potentially outdated and/or obsolete. For example, library intermediate code segments corresponding to a multiplication by two may be associated with comments containing the word "double" instead of "triple." Based on the recognition, a code update options menu 113 may be presented and a selection of a recommendation 116-1 subsequently received. Accordingly, the comment 106-1 may be updated to comment 106-2, incorporating the change indicated by the recommendation 116-1. In some embodiments, a recommendation may include an option to delete a potentially obsolete code. Accordingly, an update to a comment may comprise a comment addition and/or a comment deletion.

In some embodiments, comments may be updated in a code based on a confidence level associated with the comment being above a threshold. A confidence-based update may not require receipt of feedback via a recommendation menu. For example, a comment 117-2 may have been inserted into the code based on a high confidence level. In another example, a comment may be deleted automatically based on a high confidence level indicating that the comment is likely obsolete. Confidence levels may be based on calculated differentiation of a code from an expected code identified from a library and/or constructed via use of a machine learning model.

A code file may be saved automatically throughout an updated process in the same or a new version, for example, after each update. Alternatively, changes may not be immediately saved. A notification of the completion of a code and/or comment analysis may be displayed, such as in printed response 118. Alternatively, or additionally, notifications may be presented via other methods, for example, in a comment update, such as in header comment 104-2, a pop-up notification, or a message otherwise displayed or sent.

Figure 2:
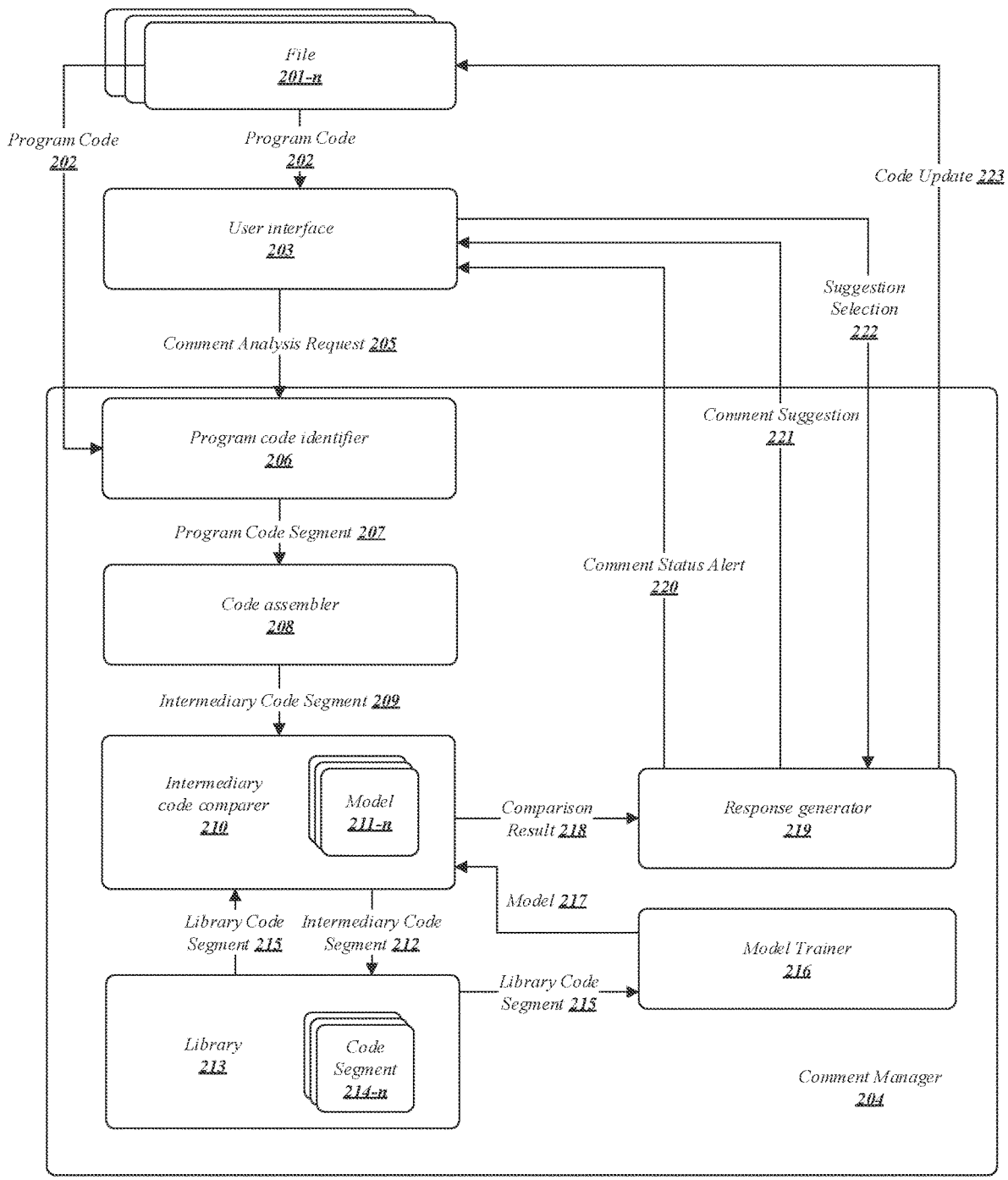
FIG. 2 is an exemplary block diagram illustrating an architecture suitable for use with various embodiments.

FIG. 2 illustrates an exemplary block diagram according to one or more embodiments described herein. Components of architecture 200 may be implemented on at least one apparatus, transitory and/or non-transitory storage medium containing instructions, logic circuitry, or combination thereof, such as discussed with respect to FIGS. 5-6. Logic circuitry, refers to the hardware or the hardware and code that implements one or more logical functions, as described herein. Components of architecture 200 may be coupled via a wired connection, a wireless connection, or a combination thereof, and may be implemented in a single device or across multiple devices. Embodiments are not limited in this context.

At least one file 201-$n$ may contain compilable material. In many embodiments, files may contain program code, wherein program code refers to code in a human-understandable programming language. A file 201-$n$ may contain one or more comments comprising text to be ignored by a compiler. Files such as file 201-$n$ may be stored in a local datastore, remote datastore, or a combination thereof.

A user interface 203 may receive and/or display program code 202 from one or more files 201-$n$. The user interface 203 may be a part of or otherwise communicatively coupled to processing logic, such as in a laptop computer, desktop computer, mobile device, or server. The user interface 203 to receive input, such as via a keyboard and/or mouse. Furthermore, the user interface 203 may visually display information, such as aspects of a file 201-$n$ and/or a comment manager. Furthermore, the user interface 203 may display comments associated with the program code 202.

The user interface 203 may be coupled to a comment manager 204. In various embodiments, the comment manager 204 may be embodied on one or more computer-readable storage media, for example, in association with a user device and/or server. In many embodiments, a comment manager 204 may be implemented in logic circuitry comprising one or more circuits.

Specifically, a comment manager 204 may receive a comment analysis request 205 at a program code identifier 206. A comment analysis request 205 may be received based on input received at the user interface 203. In some embodiments, a request may comprise a direct instruction, such as via one of buttons 107 and 108 or an entered command 109.

Alternatively, or additionally, a request may comprise an inferred instruction. For example, settings for a comment manager 204 may instruct partial or full analysis of comments to be performed based on a trigger at the user interface or in a file 201-$n$. For example, the saving of a file 201-$n$ may indicate an updated code, and a user interface 203 may accordingly send a comment analysis request 205 to a comment manager 204. In some embodiments, a comment manager 204 and/or a program code identifier 206 may retrieve all of or part of a program code 202 from a file 201-$n$ based on receiving a comment analysis request 205, as part of a comment analysis request 205, or in conjunction with a comment analysis request 205.

A program code identifier 206 may identify all or part of a program code 202 as a program code segment to be analyzed. In many embodiments, a program code identifier 206 may identify segments of a program code in conjunction with and/or based on comments associated with parts of or all of the program code. The segment of program code together with the associated comments may be sent as a program code segment 207 to a code assembler 208. In other embodiments, a segment of program code may be sent as a program code segment without any associated comments. In some embodiments, a program code segment 207 may include one or more identifiers. Identifiers may indicate a program language, a user and/or entity associated with the code, or other indications of the context of the program code.

A code assembler 208 may receive a program code segment 207 and compile the program code segment 207 to an intermediate language. Various embodiments may include one or more code assemblers 208 capable individually or together of compiling code from a plurality of source languages to a common intermediate code language. In this way, embodiments may enable the management of program codes from across a plurality of platforms. Compiled intermediate code may be associated with the same respective comments and identifiers as program code segments 207 and send as intermediary code segment 209 to an intermediary code comparer 210.

An intermediary code comparer 210 may use the intermediary code segment 209 to determine whether a corresponding program code 202 requires updated comments. Specifically, an intermediary code comparer may receive and/or identify a segment of test code in the intermediary language. In some embodiments, the test code may be identified using at least one model 211-$n$. The test code may be selected and/or constructed based on similarity to the intermediary code in the intermediary code segment 209.

A model 211-$n$ may comprise a database, a statistical model, a machine learning model, or a combination thereof. In some embodiments, a similarity between intermediary code segments, such as between an intermediary code segment 209 and a test code, may be determined using a Levenshtein distance metric. For example, a model 211-$n$ may include and/or otherwise employ a Levenshtein distance metric.

The intermediary code comparer 210 may retrieve and/or receive a test code from a datastore of code segments. For example, a library 213 may be a datastore including a data structure configured to store comments from one or more different source program and/or training codes, along with associations identifying corresponding intermediate code segments with the source codes. A library 213 may comprise at least one code segment 214-$n$. A code segment 214-$n$ in a library may be stored locally to a library 213 or be stored remotely. In some embodiments, aspects of a library 213, which may include a code segment 214-$n$, may include data managed by third-party entities. For example, a library 213 may include at least one code segment 214-$n$ from an open-source programming system. Inclusion of code segments from various sources may benefit a system by increasing a likelihood that comments associated with a code are relevant across users and platforms.

In many embodiments, code segments may be repeated in a library 213. For example, two identical or substantially similar code segments 214-$n$ may be included in a library 213 based on their inclusion in an open source project. Repeated, identical, and/or substantially similar code segments may be identified by a model, Levenshtein distance under a threshold value, or direct match as described with respect to other components described herein.

Identical or substantially similar code segments 214-$n$ may be associated with the same or with different comments. In many embodiments, identical or substantially similar code segments may be associated with and/or linked to each other in a library. As a result, each of the comments associated with any of the linked code segments may be associated with all the linked code segments. In some embodiments, repeated, identical, and/or substantially similar comments code segments may be merged or otherwise represented by a single entry in a library 213, wherein all the comments of the individual code segments associated therewith are associated with the single entry. Likewise, repeated and/or substantially similar comments may be represented by a common listing.

In some embodiments, one or more counter values may be associated with the library entry and/or the comments associated therewith. For example, a counter value of twenty may be associated with a code segment 214-$n$ if twenty repetitions of the code segment were identified across the sources for the library 213. In this example, if four of the repetitions of the code segment had contained the same comment A, then the code segment 214-$n$ may be associated with the comment A with a related counter of four. In this way, the storage requirement of a library may be decreased while context is kept relating to the popularity of a code segment and/or comment across multiple sources.

In some embodiments, an intermediary code comparer 210 may use an intermediary code segment 212, which may be all or part of an intermediary code segment 212 including a code segment in an intermediary language, to access code segments a library 213. For example, an intermediary code comparer 210 may identify a code segment 214-$n$ in a library 213 based on an exact match to an intermediary code segment 212. In some embodiments, a code segment 214-$n$ may be identified based on a minimized Levenshtein distance between one or more code segments in the library 213. In some embodiments, a code segment 214-$n$ may be identified at the intermediary code comparer 210 based on similarity to a test code identified by a model 211-$n$. The model 211-$n$ informed by one or more code segments 214-$n$ from a library 213, as described in greater detail with respect to FIG. 3. At least one code segment 214-$n$ identified as a match to intermediary code segment 212 may be sent to or retrieved by the intermediary code comparer 210 as a library code segment 215. Comments associated with the code segment 214-$n$ may be sent in association with and/or as a part of library code segment 215.

In many embodiments, an intermediary code comparer 210 may use a library code segment 215 determined to correspond with an intermediary code segment 212 and/or an intermediary code segment 209 as a test code segment. The intermediary code comparer 210 may compare the intermediary code segment 209 with the test code segment as described above.

A library 213 may be used, in some embodiments, to train one or more of the models employed by the intermediary code comparer 210. For example, a model trainer 216 may retrieve a library code segment 215 comprising a code segment 214-$n$ and one or more associated comments from a library 213. The model trainer 216 may generate, develop, and/or update at least one model based on the library code segment 215. In many embodiments, a model trainer 216 may retrieve a plurality of library code segments 215 from a library 213 and accordingly train one or more models. Models may include neural networks, distance measurements, and/or other constructs useful for recognizing the relationships between different library code segments, between code segments and associated comments in a library code segment, and/or between comments associated with different library code segments. A model trainer may provide at least one model 217 for use by an intermediary code comparer 210. For example, a model 211-$n$ may be a model 217.

In some embodiments, an intermediary code comparer 210 may determine a status of an intermediary code segment 209 based on one or more comparisons between the intermediary code segment 209 and the test code. For example, measures of similarity between the intermediary code segment and the test code and/or between the comments associated with each may be used to determine if comments associated with an intermediary code segment 209 match comments associated with a respective test code. A lack of a match or a low confidence match may indicate that a comment is outdated and/or obsolete.

Based on the determination of similarity and/or deviation between the intermediary code segment 209 with the test code segment, the intermediary code comparer 210 may generate a comparison result 218. The comparison result 218 may include measures of similarity between the intermediary code segment and the test code and/or between the comments associated with each. For example, a comparison result 218 may include a Levenshtein distance of 0 indicating an exact match between a library code segment 215 and an intermediary code segment 209. In another example, a comparison result 218 may include a Levenshtein distance of 1 indicating a difference in one character between a library code segment 215 and an intermediary code segment 209. Furthermore, the comparison result 218 may include measures of similarities between comments associated with the intermediary code segment 209 and the library code segment 215. For example, the comparison result may include similarity and/or deviation scores for each multiple library code segment 215 comment associated with a single comment intermediary code segment 209 comment in a many to one ratio. Comments or pointers to the library location of the comments may be included in association with their respective similarity score. If the intermediary code comparer 210 has determined a status of a comment, the status determination may be included in the comparison result 218.

A response generator 219 may retrieve and/or receive a comparison result 218 from an intermediary code comparer 210. Based on the comparison result 218, the response generator 219 may send a comment status alert 220 and/or at least one comment suggestion 221.

A comment status alert 220 may include an indication of whether a specified comment and/or a section in a program code may need to be inserted, updated, or otherwise altered. A comment status alert 220 may include a notification, an indication, a recommendation menu configuration, and/or other flag useful for enabling a user interface 203 to display a communication related to the comments of a file 201-$n$. In many embodiments, a comment status alert 220 may contain an indicator of at least one file 201-$n$, a code section therein, or a comment therein related to a comparison result 218.

A comment suggestion 221 may contain one or more comments related to a comparison result 218. If the comparison result 218 included pointers to library locations of comments, the response generator 219 may retrieve one or more comments from the library 213 based on the pointer and then include them in the comment suggestion 221. In some embodiments, all comments indicated by a comparison result 218 may be included in a comment suggestion 221. In some embodiments, only some of the comments associated with a comparison result 218 may be included in a comment suggestion 221. For example, a comment suggestion 221 may include only the several comments with the highest associated similarity scores.

Comment status alerts 220 and comment suggestions 221 may be separate or unified packages. For example, a unified package may include a comment status alert 220 indicating line 8 of the program code of workspace 103 as requiring an update and a comment suggestion 221 including recommendations 116-1, 116-2, and 116-3. The unified package may be used to generate a code update options menu 113.

A response generator 219 may send a comment status alert 220 and/or a comment suggestion 221 to a user interface 203. The user interface 203 may display a notification, menu, and/or other message related to one or more aspects received from a response generator 219. For example, the user interface 203 may display a code update options menu 113.

The user interface 203 may receive feedback based on the comment status alert 220 and/or comment suggestion 221. For example, the user interface 203 may receive via a mouse click a selection of a recommendation 116-1 of a code update options menu 113 based on a comment suggestion 221. In some embodiments, feedback may be received via a keyboard, such as via a typed command in runtime environment 102. Feedback may be sent from the user interface 203 to the comment manager 204 as a suggestion selection 222. In some embodiments, suggestion selection 222 may be received by a response generator 219.

Based on the suggestion selection 222, the response generator 219 may send another comment status alert 220 and/or another comment suggestion 221. For example, if the suggestion selection 222 includes a selection of a recommendation relating to a recommendation menu, a new comment status alert 220 and a new comment suggestion 221 may be sent so that the user interface 203 may update the recommendation menu to address a new section of the code. In another example, if a suggestion selection 222 includes an indication of the selection of a refresh button, such as refresh button 115-4, a new comment suggestion 221 may be sent without a new comment status alert 220. This may enable the user interface 203 to display new recommendations while limiting the required handoffs of information between components.

In many embodiments, a comment manager 204 may updated a file 201-$n$ based on a suggestion selection 222. In some embodiments, a response generator 219 may access the file 201-$n$ associated with the comparison result 218 and update a program code based on a received suggestion selection 222. The update may be applied to the file 201-$n$ as code update 223. The file 201-$n$ may be automatically saved and/or saved based on feedback received via the user interface 203. The updated file 201-$n$ may be displayed via the user interface 203 in real- or near real-time.

Figure 3:
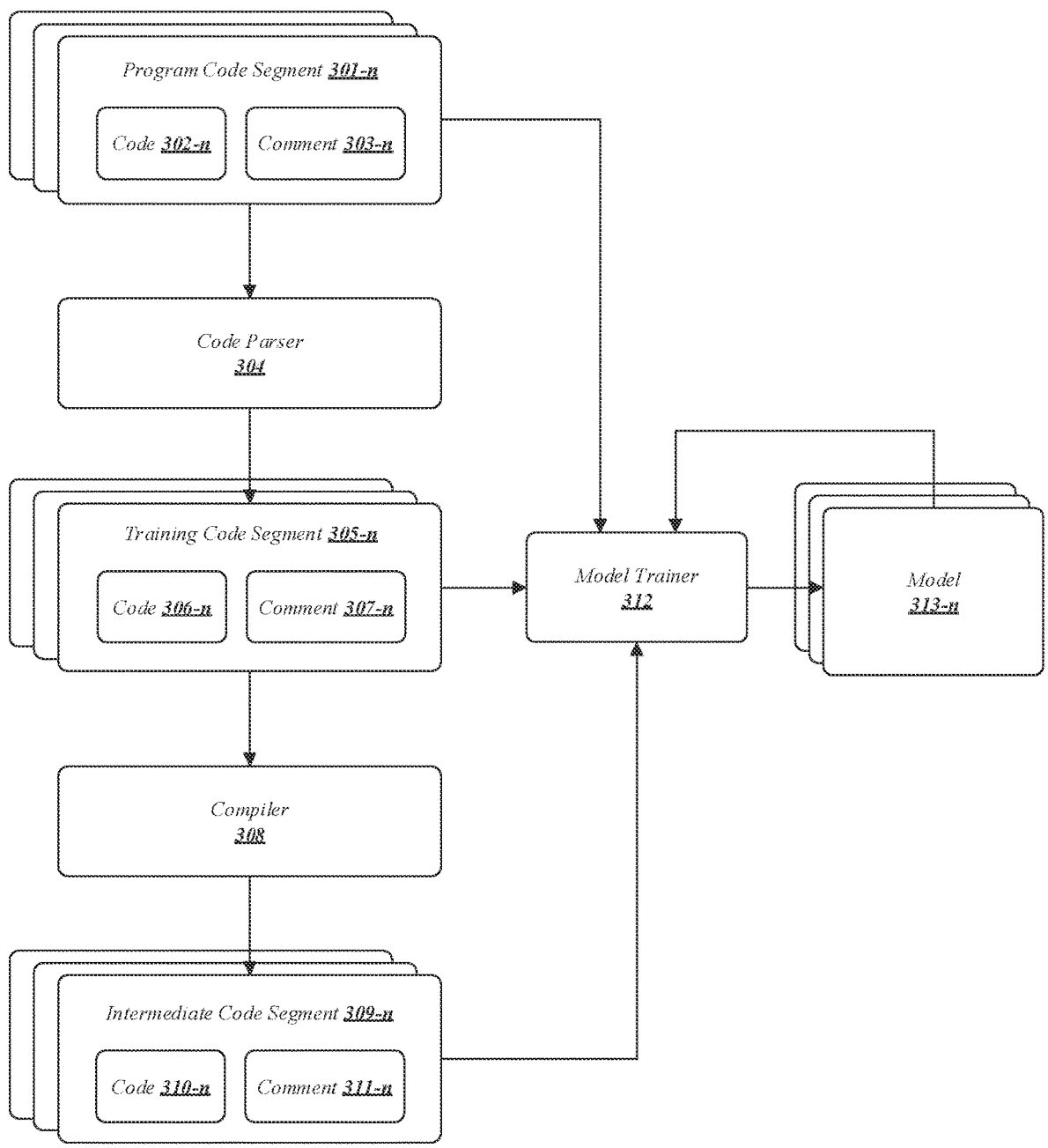
FIG. 3 is an exemplary block diagram illustrating a model training architecture suitable for use with various embodiments.

FIG. 3 illustrates an exemplary block diagram for training one or more models according to one or more embodiments described herein. For example, models 211-$n$ may be trained by the methods described with respect to FIG. 2. Embodiments are not limited in this context.

At least one program code segment 301-$n$ may each contain a code 302-$n$ and at least one comment 303-$n$. Code 302-$n$ may include all or part of the code contained in a file, such as file 201-$n$. Each comment 303-N may be associated with some or all the code 302-$n$. Each program code segment 301-$n$ may have code, such as code 302-$n$, in the same or in different program languages. A comment 303-$n$ in a program code segment 301-$n$ may have formatting corresponding to the code 302-$n$ of the program code segment 301-$n$.

A code parser 304 may process one or more program code segments 301-$n$. A code parser 304 may generate at least one training code segment 305-$n$ based on a program code segment 301-$n$. Training code may include code in a source language. Training code may contain comments associated with program code. For example, a code parser 304 may divide a program code segment 301-$n$ into at least one training code segment 305-$n$.

A code parser 304 may make divisions based on one or more codes 302-$n$ in a program code segment 301-$n$ and/or one or more comments 303-$n$. For example, a code parser 304 may divide a program code segment 301-$n$ into several training code segments 305-$n$ based on the program code segment 301-$n$ containing several codes 302-1 . . . 302-$n$ representing sections of a program code, such as code section 105-1. Additionally, or alternatively, a code parser 304 may divide a program code segment 301-$n$ into several training code segments 305-$n$ based on comments 303-1 . . . 303-$n$ contained in the program code segment 301-$n$. For example, the code parser 304 may divide a program code segment 301-$n$ into segments of code based on the code 302-1 . . . 302-$n$'s association with comments 303-1 . . . 303-$n$. A comment 303-$n$ may be used to identify a section of code, such as code 302-$n$, based on formatting, or a code parser 304 may define a section of code based on a comment 303-$n$. For example, a code parser 304 may define a code section for a training code segment 305-$n$ as including line 8 of the code contained in workspace 103, wherein the definition is based on the presence of comment 106-1. In some embodiments, a code parser 304 may combine two or more program code segments 301-$n$ in order to generate a training code segment 305-$n$.

Each training code segment 305-$n$ may have code, such as code 306-$n$, in the same or in different program languages. A comment 307-$n$ in a training code segment 305-$n$ may have formatting corresponding to the code 306-$n$ of the training code segment 305-$n$. A program language of a training segment 305-$n$ may be the same as or different from a corresponding program segment 301-$n$. For example, two program code segments 301-1 and 301-2 may be associated with different program languages but used to generate a common training code segment 305-$n$ based on a comparison of respective comments 303-1 and 303-2 and/or other indicators. In this example, the resulting training code segment 305-$n$ may be in one of the two program languages or in a third language. A training code segment 305-$n$ may include one or more indications of training languages associated with a corresponding program code segment 301-$n$ used in its generation.

Code and/or comments of a program code segment 301-$n$ may be repeated or not included in a training code segments 305-$n$. For example, a code parser 304 may not generate a training code segment 305-$n$ from a program code segment 301-$n$ which does not contain a comment 303-$n$.

Each training code segment 305-$n$ may contain one or more sections of code 306-$n$ and/or one or more comments 307-$n$. Code 306-$n$ and comment 307-$n$ may be associated with each other in a one-to-one, a one-to-many, or a many-to-one relationship. For example, two program code segments 301-1 and 301-2 may contain the same code 302-1 but different comments 303-1 and 303-2. In this example, a code parser 304 may combine program code segments 301-1 and 301-2 into a single training code segment 305-1 containing a single code segment 306-1 corresponding to code 302-1, as well as comments 307-1 and 307-2 corresponding to comments 303-1 and 303-2. Each comment 307-$n$ in a training code segment 305-$n$ may be the same, a copy of, or different than a comment 303-$n$ in a program code segment 301-$n$ used to generate the training code segment 305-$n$. For example, a code parser 304 may generate a comment 307-$n$ based on multiple program code segments 301-*n* by using a model, a library of similar comments, and/or other method.

A compiler 308 may process at least one training code segment 305-*n*. In many embodiments, a compiler 308 may compile a training code segment 305-*n* into an intermediate code segment 309-*n*. A compiler 308 may process a plurality of training code segments 305-1 . . . 305-*n* in series or in parallel to produce a plurality of intermediate code segments 309-1 . . . 309-*n*. In some embodiments, an intermediate code segment 309-*n* may include one or more indications of association with at least one training code segment 305-*n* and/or program code segment 301-*n* used in its generation.

An intermediate code segment 309-*n* may include code 310-*n* associated with code 306-*n*. In many cases, a code 310-*n* may be a 306-*n* that has been compiled into an intermediate language. Training code segments 305-1 . . . 305-*n* may be associated with the same or different programming languages. Intermediate code segments 309-1 . . . 309-*n* may, in many embodiments, be associated with the same intermediate language. Accordingly, a plurality of languages associated with program codes 301-1 . . . 301-*n* may be processed to generate intermediate code segments 309-1 . . . 309-*n* in a common intermediate language, enabling comparison of code functionality across languages rather than comparison of specific programming language traits.

An intermediate code segment 309-*n* may include at least one comment 311-*n*. A comment 311-*n* may be associated with a code 310-*n* and be associated with at least one comment 307-*n* of a respective training code segment 305-*n*. In some embodiments, a comment 311-*n* may be the same as a respective comment 307-*n*. In other embodiments, a compiler 308 may process a comment 307-*n* to generate comment 311-*n* by changing formatting and/or other content to match a generalized comment format of the intermediate language.

A model trainer 312 may use at least one intermediate code segment 309-*n* to train at least one model 313-*n*. A model 313-*n* may be trained to recognize and/or determine aspects of an intermediate code segment 309-*n* based on aspects of a corresponding program code segment 301-*n*. Additionally, or alternatively, a model 313-*n* may be trained to recognize and/or determine aspects of an intermediate code segment 309-*n* based on aspects of a corresponding training code segment 305-*n*. In some embodiments, a model trainer 312 may be a model trainer 216.

A model 313-*n* may include a determination of an exact match between comments of a program code 301-*n*, a training segment code 305-*n*, and an associated intermediate training code segment 309-*n*. Alternatively, or additionally, a model 313-*n* may determine a distance between respective comments. For example, a model 313-*n* may employ a measure of Levenshtein distance or another string metric for measuring the difference between sequences. A Levenshtein distance, for example, may measure the number of character differences between two strings.

In some embodiments, a model 313-*n* may be trained to recognize the association between a code 310-*n* and a comment 311-*n*. In some embodiments, a model 313-*n* may be trained to generate a comment 311-*n* based on a code 310-*n*. Additionally, or alternatively, a model 313-*n* may be trained to recognize and/or generate at least one program code segment 301-*n* based on an intermediate code segment 309-*n*. For example, based on code 310-*n* and/or comment 311-*n* in at least one intermediate code segment 309-*n*, a model 313-*n* may generate a comment in a program language, such as comment 303-*n*. A model 313-*n* may include at least one neural network, such as a convolutional neural network, a recursive neural network, a sequence-to-sequence model, or other artificial intelligence model. For example, a neural network may be used to identify similarity between comments by natural language processing (NLP). Accordingly, a system may determine the similarity of comments based on context and semantics.

In many embodiments, a model trainer 312 may train and retrain a model 313-*n*, for example, based on the availability of at least one new program code segment 301-*n*, training code segment 305-*n*, and/or intermediate code segment 309-*n*, a received instruction, or another indication.

Figure 4:
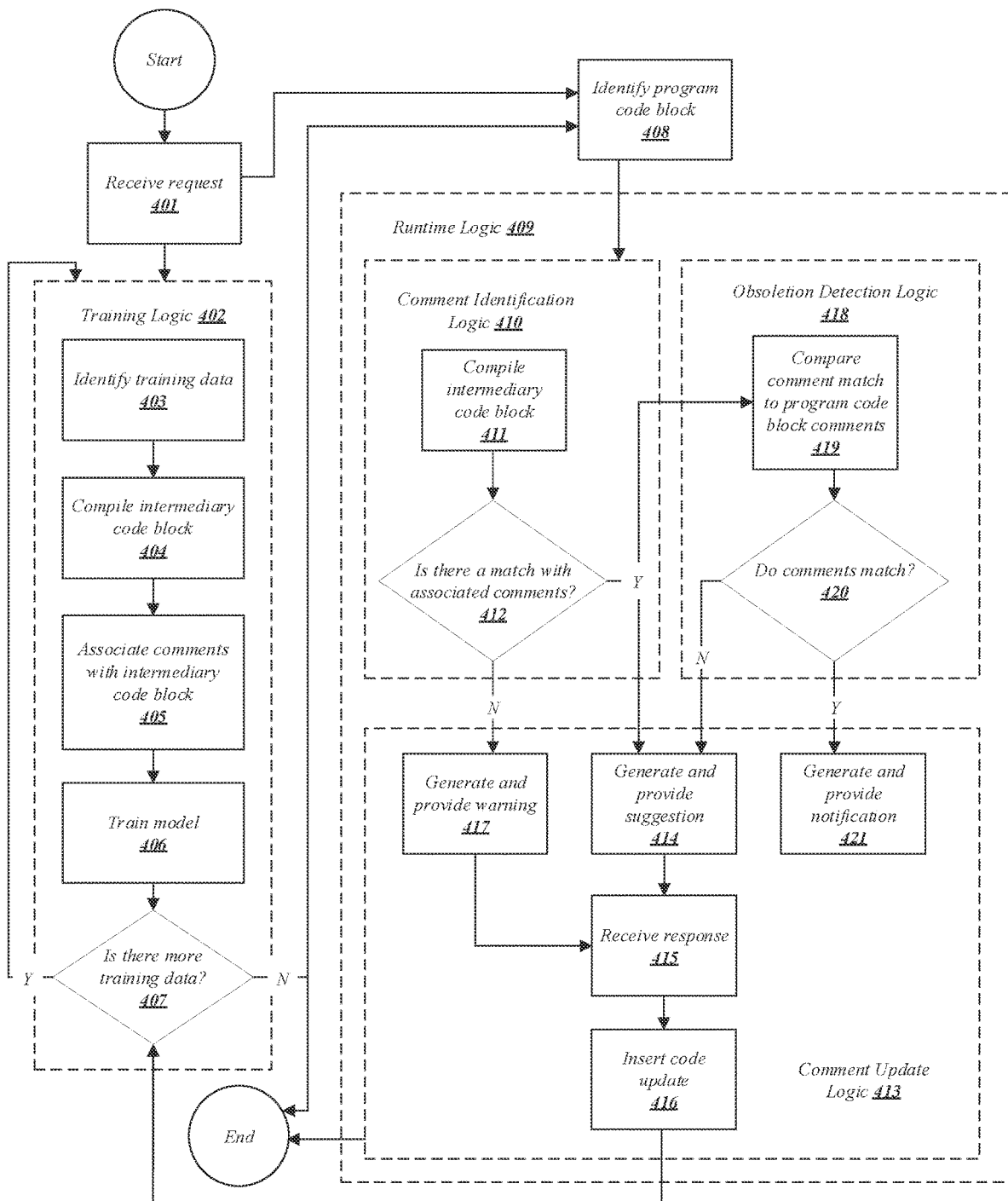
FIG. 4 is a data flow diagram depicting exemplary data flows for managing code comments.

FIG. 4 depicts a flowchart showing an exemplary method for managing comments. Exemplary logic 400 (such as logic circuitry including, e.g., processing circuitry and computer executable instructions) is organized into various groups of logics (e.g., training logic 402, runtime logic 409, comment identification logic 410, comment update logic 413, and obsoletion detection logic 418. In some embodiments, these logic modules may be provided on one or more servers, as described with respect to FIG. 6, although it is understood that such a configuration is not required. All the modules may be implemented in the same device or may be distributed across any number of devices. Various combinations of modules may be employed on a given device, or the logic of an individual module may be performed by different devices. Embodiments are not limited in this context.

Processing begins at block 401, where logic may receive a request to analyze comments in association with one or more sets of program code. For example, a request may be a comment analysis request 205. In some embodiments, a request may be an event. For example, a user interface 203 may receive entry of program code, such as via a keyboard. An entry of program code may comprise an edit of a program code. When logic has received a sufficient amount of program code to compile the code, a request event may be triggered. Determination of sufficiency of an amount of received program code may be made based on a number of lines of code received, a number of commands recognized in the code, a save to a file containing the received code, a reception of the beginning of a new section of code, or other method. In some embodiments, a compilable count of lines may be determined by a preference and/or setting.

From block 401, processing may continue to training logic 402. Training logic 402 may be used to train models useful for comment management, such as model 211-*n*. Training logic 402 may be useful for one or more aspects of environment 300 and/or a comment manager 204. For example, aspects of training logic 402 may be used by a code parser 304, a compiler 308, and/or a model trainer 312 to train a model 313-*n*. In another example, training logic 402 may be implemented by a model trainer 216.

Processing in training logic 402 may begin at block 403 with the identification of training data. In some embodiments, logic of block 403 may be performed by a code parser 304 and identify training data comprising a training code segment 305-*n*. In some embodiments, a program code identifier 206 may function as a code parser 304 and/or otherwise implement logic of block 403. Training data may be identified based on an instruction received via a user interface, a determination of availability of training data not previously used in training, or other indication. Training data may be identified from one or more databases, which may be local libraries, remote libraries, or a combination thereof. In some examples, databases may be managed by a third-party. In various embodiments, training data may be identified from an open-source code bank. Training data may be identified as entire contents of code files, such as file 201-*n*, or as a segment or block of code therefrom. For example, training data may be identified as a section of code including a number of lines of code surrounding an associated comment. Training data may be associated with at least one comment.

From block 403, logic may continue to block 404, wherein logic may compile an intermediary code block. An intermediary code block may contain code from training data compiled to an intermediary language and/or compilation stage. For example, an intermediary code block may be code 310-*n*.

From block 404, processing may proceed to block 405 with the association of comments with the intermediary code block. Comments associated with the intermediary code block may include comments originally found in training data or processed comments. For example, language-specific formatting may be removed in comments associated with intermediary code blocks. In some embodiments, intermediary code blocks may be associated with comments in a datastore, such as library 213. In some embodiments, intermediary code blocks together with associated comments may make up an intermediate code segment 309-*n*.

Logic at blocks 404 and/or 405 may be performed, in some embodiments, by a code assembler 208 and/or a compiler 308.

Processing may continue from block 405 to block 406. Logic at block 406 may train one or more models. Models may be useful for determining the similarity of an intermediary code block to intermediary code in a library and/or the similarity of comments associated with an intermediary code block to comments associated with intermediary code in a library. Models may include one or more of neural networks, difference measures such as a Levenshtein distance, determination of an exact match, or other method for analyzing differences between strings. In some examples, logic at block 406 may be implemented by a model trainer 312.

From block 406, processing may proceed to block 407. At block 407, a determination may be made, for example, by a comment manager 204, whether additional training of a model should be performed. In some cases, determination may be made based on the availability of data which has not been previously used to train a model. For example, new data received via a keyboard coupled to a user interface, new data available via a remote library, or other data received may be available for training a model. A determination may be based on receipt of an instruction to re-enter a training process, in some cases. For example, an instruction may be received via a user interface. In some cases, a determination may be automatically set, such as, by a time frame. For example, a setting may indicate that training should be performed weekly. Based on the determination that additional training is desired, logic may return to block 403, and training logic 402 may repeat with respect to the same training data, different training data, or a combination thereof.

If a determination has been made that additional training is not immediately desired for a model, logic may proceed from block 407. In some embodiments, processing may end. In some embodiments, processing may proceed to block 408. In some embodiments, processing may end or wait, then receive a new request in block 401. In some embodiments, processing may directly proceed to block 408 from block 401. Accordingly, training and runtime steps of logic may be unified or separated in various embodiments.

In block 408, a program code block is identified by logic. A program block code may be the same or different from previously received training data, and it may include at least some code in a program language. A program code block may or may not have at least one comment associated with program code. In some embodiments, a program code block may be identified based on one or more comments. For example, a program code block may be defined as a segment of code including a set number of lines of code before and after a comment. In some embodiments, a program code block may be defined independently of comments. For example, a program code block may be defined as a set number of lines of code, a set number of recognized commands, a formatted section of code, or other segmentation. In some embodiments, logic associated with block 408 may be performed by a program code identifier 206 and/or a program code segment 207 may comprise a program code block.

Block 408 may hand off processing to runtime logic 409. In some embodiments, block 408 may be included in runtime logic 409. Runtime logic 409 may include one or more logic blocks, such as comment identification logic 410, obsoletion detection logic 418, and/or comment update logic 413. Block 408 may, in some embodiments, hand off processing to comment identification logic 410.

Comment identification logic 410 may include blocks 411 and 412. At block 411, an intermediate code block may be compiled based on the program code block identified in block 408. Logic of block 411 may be implemented by a code assembler 208, as an example. At block 412, a determination may be made as to whether a match for comments can be identified based on a library for the intermediary code block of block 411. The determination may be made using a model, such as a model trained in block 406.

In some embodiments, a model may be used to determine a match in a database for the intermediary code block generated by logic of block 411. Logic of block 412 may be performed, for example, by an intermediary code comparer 210. The match may be determined based on a model, such as model 211-*n* and/or model 313-*n*. In many embodiments, a selected match may be a code segment 214-*n*, including a code segment and associated comments. Based on the successful determination of a match for the intermediary code block, logic may identify comments associated with the match in the database.

Based on the determination at block 412, logic may continue to comment update logic 413. Comment update logic 413 may include one or more logic pieces that can use results of prior comment analysis to present one or more practical responses.

For example, if logic of block 412 determines a library match for the intermediary code block of logic block 411, and the match is associated with comments, then logic may proceed to logic block 414. In some embodiments, a library match may be a library segment 215. In many embodiments, logic may progress to block 414 in the case that the intermediary code block is not associated with comments. At block 414, logic may generate a suggestion including one or more comments that are associated with the match. For example, logic of block 414 may be implemented by a response generator 219 and a suggestion may comprise a comment status alert 220 and/or a comment suggestion 221. Logic at block 414 may provide the suggestion for display via a user interface, for example, user interface 203. It will be understood that steps of generating the suggestion and providing the suggestion for display may comprise one or multiple logic steps.

Comment update logic 413 may receive a response to the suggestion of block 414 at block 415. In some embodiments, a response received at block 415 may include a suggestion selection 222. Based on the received response, logic may proceed by inserting a code update into a program code at block 416. For example, a code update may comprise code update 223. In some embodiments, processing may end at this point. In other embodiments, the inserted code update may comprise new data that may be used to further train models. For example, the comment indicated as selected by the received response, which had previously only been associated with the library match for the intermediary code segment, may be newly associated with the intermediary code segment in the library as a new training code entry. Accordingly, the insertion may be recognized as a request 205 by logic of block 401 and/or logic of block 407 may be triggered to train a model based on the insertion via training logic 402.

If the logic of block 412 does not find a library match for the intermediary code block of block 411, or if the code match does not have associated comments known to the library, logic may proceed from block 412 to block 417. At block 417, logic may generate a warning. Logic may further provide the warning for display, such as via user interface 203. A warning may comprise a comment status alert 220 or another indication that a comment could not be appropriately matched for the program code segment via an automated process.

In some embodiments, a warning may prompt manual entry of at least one comment in association with the program code, which may be received by logic of block 415. In some embodiments, comment update logic 413 may interpret the manual entry as a suggestion selection 222. For example, the entry may be inserted into the code as a code update via logic of block 416. In some embodiments, processing may end at this point. In other embodiments, the inserted code update may comprise new data that may be used to further train models. Accordingly, the insertion may be recognized as a request 205 by logic of block 401 and/or logic of block 407 may be triggered to train a model based on the insertion via training logic 402.

In some embodiments, logic of block 412 may determine that there is a library match for the intermediary code block of logic block 411 with associated comments, wherein the intermediary code block is associated with comments. In this case, logic may move from block 412 to obsoletion detection logic 418. Obsoletion detection logic 418 may determine whether a comment associated with an intermediary code segment matches an expected comment for the intermediary code segment. The lack of a match may indicate that the comment is outdated and/or obsolete. Aspects of obsoletion detection logic 418 may be performed, for example, by an intermediary code comparer 210.

In particular, logic may progress from block 412 to block 419 in obsoletion detection logic 418. In block 419, a comment associated with the library match for the intermediary code block may be compared to a respective comment associated with the program code block. Based on the determination of the match of the intermediary code block with the matched code block in the library, the comment associated with the library match may be determined to be an expected comment for the intermediary code block and/or respective program code block. In some embodiments, the expected comment may be compared to the actual respective comment associated with the intermediary code block and/or program code block. Comparison may be made using at least one model, such as model 211-n and/or model 313-n, a distance measure, a NLP analysis, or other method useful for comparing string content, context, and/or meaning. Comparison measures may be quantified in one or more comparison scores.

Logic may continue from block 419 to block 420, at which point a determination may be made as to whether the expected comments and the respective comments of the program and/or intermediary code block match. In many cases, a match may be determined by a comparison score being above a threshold and/or a deviation score being below a threshold.

A determination that the comments of the intermediary and/or program code blocks do not match expected comments may cause processing to progress from block 419 to block 414. At block 414, a suggestion may be generated based on previous processing and provided, such as via a user interface 203. A suggestion may comprise a warning that at least part of a code may be obsolete, and the suggestion may contain a reference to the part of the code for which comments did not match expected comments. In some embodiments, a suggestion may include one or more expected comments, for example, as a recommended replacement for the potentially obsolete comments of the respective program code.

Processing may continue to block 415 based on receiving a response regarding the suggestion of block 414. As explained above, a response received in block 415 may be used to update a program code block in block 416 and/or initiate a new training phase via training logic 402.

In some embodiments, a notification or indication may be generated at logic block 421 based on determination of matches between the comments of program and/or intermediary code blocks and expected comments. For example, a confirmation of a calculated likelihood that code is updated may be provided via a user interface 203. In many embodiments, processing may end after block 420.

Figure 5:
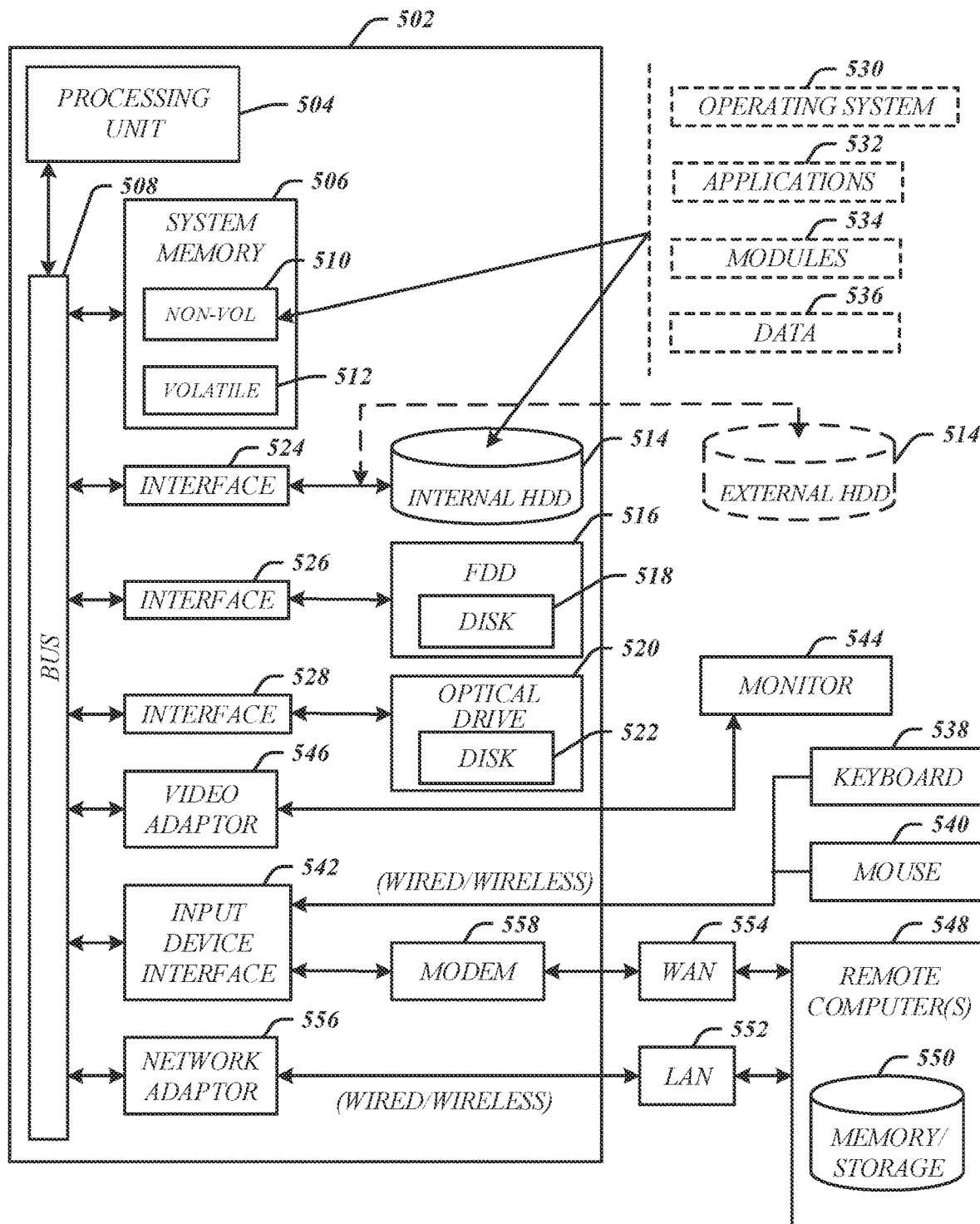
FIG. 5 is a block diagram depicting an exemplary computing device suitable for use with exemplary embodiments.
Figure 6:
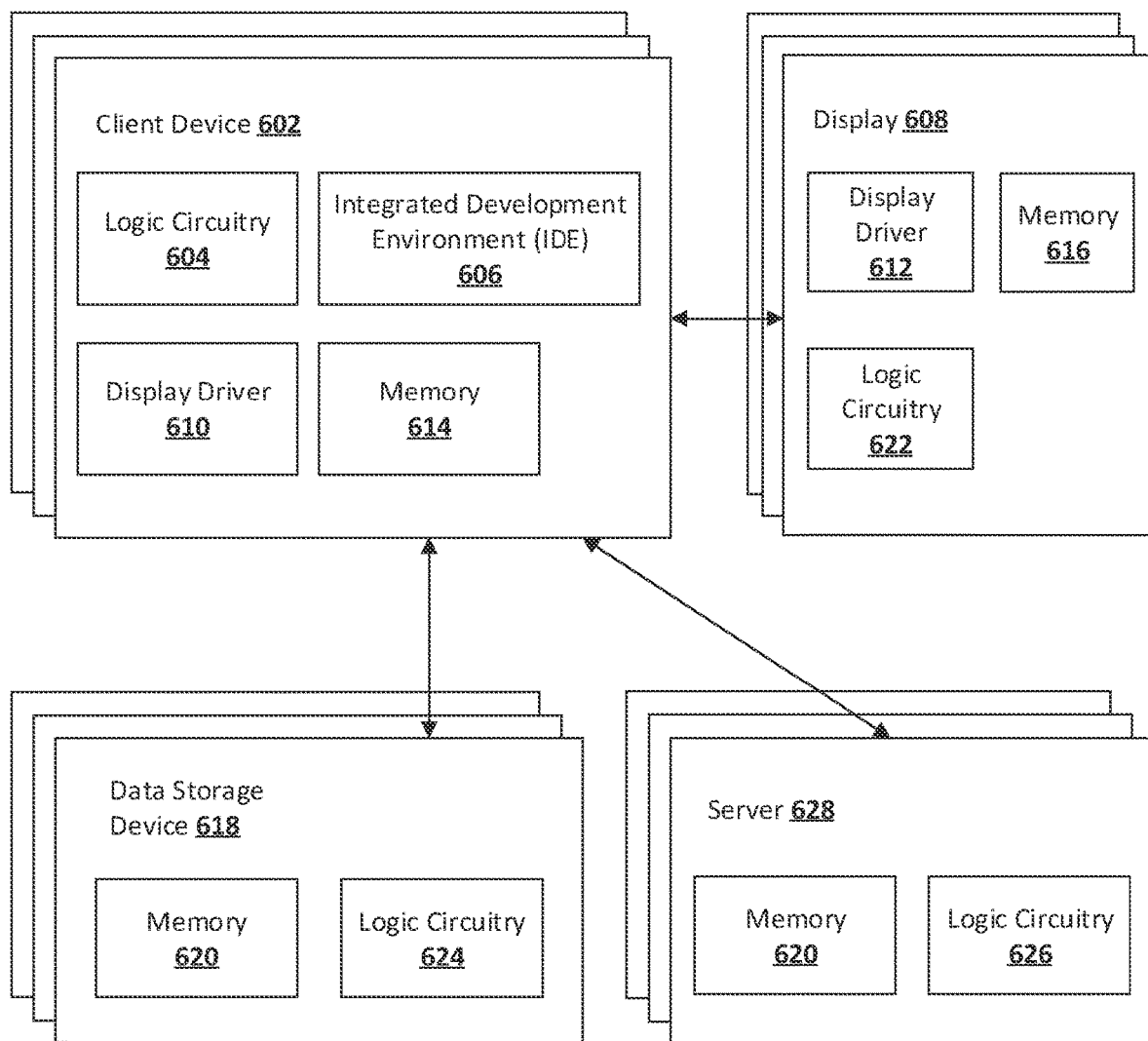
FIG. 6 is a block diagram illustrating an exemplary system architecture suitable for use with various embodiments.

FIG. 5 illustrates an embodiment of an exemplary computing architecture 500 that may be suitable for implementing various embodiments as previously described such as the client device 602, data storage device 618, and or the server 628 shown in FIG. 6. In various embodiments, the computing architecture 500 may comprise or be implemented as part of an electronic device. In some embodiments, the computing architecture 500 may be representative, for example, of one or more component described herein. In some embodiments, computing architecture 500 may be representative, for example, of a computing device that implements or utilizes one or more of user interface 203, comment manager 204, code parser 304, compiler 308, model trainer 312, and/or one or more techniques described herein. Embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 comprises a processing unit 504, a system memory 506 and a chipset and bus 508. The processing unit 504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi processor architectures may also be employed as the processing unit 504.

The chipset and bus 508 provides an interface for system components including, but not limited to, the system memory 506 to the processing unit 504. The chipset and bus 508 can include any of several types of bus structure that may further interconnect to a memory bus (with or without a memory controller), a peripheral bus, and a local bus using any of a variety of commercially available bus architectures. Interface adapters may connect to the chipset and bus 508 via a slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and the like.

The system memory 506 may include various types of computer-readable storage media such as non-transitory computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. In some embodiments, system memory 506 may include main memory. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the chipset and bus 508 by a HDD interface 524, an FDD interface 526 and an optical drive interface 528, respectively. The HDD interface 524 for external drive implementations can include at least one or both of Universal Serial Bus (USB) and Institute of Electrical and Electronics Engineers (IEEE) 694 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include or implement, for example, the various techniques, applications, and/or components described herein.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the chipset and bus 508, but can be connected by other interfaces such as a parallel port, IEEE 994 serial port, a game port, a USB port, an IR interface, and so forth.

A monitor 544 or other type of display device is also connected to the chipset and bus 508 via an interface, such as a video adaptor 546 or other display driver. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. In various embodiments, one or more migrations may occur via the networked environment. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the chipset and bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

FIG. 6 is a block diagram illustrating an exemplary system architecture 600 according to one or more embodiments described herein. In architecture 600, client device 602 may be coupled to a data storage device 618, a display 608, and/or a server 628. Embodiments are not limited in this context.

A client device 602 may be a computing device configured to receive input including source code, comments, and/or other input. For example, a client device 602 may be a desktop computer, a laptop, a mobile device, or other device. In various embodiments, a client device 602 may include and/or be coupled to one or more input devices to enable reception of input, for example, a keyboard, a mouse, a touch screen, or other device. In many embodiments, a client device 602 may include an architecture such as architecture 500, discussed with respect to FIG. 5, and/or system 800, discussed with respect to FIG. 8.

A client device 602 may include logic circuitry 604 and an integrated development environment (IDE) 606. Logic circuitry 604 may include hardware and/or hardware with instructions stored thereon. In some embodiments, an IDE 606 may be included in the logic circuitry 604. An IDE 606 may include a code editor, a compiler, and/or a GUI enabling a user to write and edit source code. Logic circuitry 604 may be configured to manage comments in a source code, for example, a source code received via an IDE 606. For example, logic circuitry 604 may be configured to analyze source code. Based on the analysis, the logic circuitry 604 may generate comments to add to the source code. In some embodiments, the logic circuitry 604 may determine whether a comment in a source code is obsolete. Based on the determination, the logic circuitry 604 may delete the obsolete comment or generate an alternative comment. The logic circuitry 604 may be configured to present one or more recommendations relating to comment management via the IDE 606. For example, logic circuitry 604 may be configured to present aspects of user interface 101 via a GUI of IDE 606.

In many embodiments, a GUI of an IDE may be presented via a display 608 coupled to the client device 602. The display 608 may be a part of the same or a different device from client device 602. For example, a display 608 may be a monitor coupled to a desktop computer, a laptop screen, or a screen of a mobile device. The display 608 may operate via a display driver. In many cases, the client device 602 may comprise a display driver 610 for the display 608. In some embodiments, a display driver 612 may be included in logic circuitry 622 in the display 608. The display 608 may be configured to display pixels associated with each unique user interface. The display driver 610 and/or display driver 612 may store the pixels in memory, such as memory 614 and/or memory 616, respectively, such that each unique user interface corresponds to physical changes of the memory by the display driver(s). Accordingly, each user interface not presented before may result in a unique physical configuration of the memory.

The memory may be included onboard the client device 602, such as with memory 614. In some embodiments, memory may be externally coupled to the client device 602. For example, a data storage device 618 may contain memory 620. In some embodiments, memory may contain and/or be coupled to logic circuitry, such as logic circuitry 604. In some embodiments, memory may contain data relating to at least one user, code source, code databank, code language, or other information to enable logic circuitry to manage comments in a code, for example, by the processes described with respect to FIG. 4. For example, a memory may include one or more rules or formatting procedures associated with a code language. In some embodiments, memory may include a library 213.

In many embodiments, a client device 602 may be communicatively coupled with at least one server, such as server 628. One or more aspects of a memory 620 may be stored on and/or accessed via the server 628. For example, a memory 620 may include a library 213.

In some embodiments, a display 608, a data storage device 618, and/or a server 628 may include logic circuitry to implement part of or all of the functionality of a comment management system. Accordingly, logic circuitry 622 on a display 608, logic circuitry 624 on a data storage device 618, and/or logic circuitry 626 on a server 628 may operate the processes described with respect to FIG. 4. For example, logic of block 401 may be implemented by logic circuitry 622. Training logic 402 may be located on logic circuitry 626, comment identification logic 413 and obsoletion detection logic 418 may be implemented on logic circuitry 624, and comment update logic 413 may be implemented on logic 604.

Additionally, it will be understood that more than one client device 602, display 608, data storage device 618, and/or server 628 may coordinate to form a comment management system. For example, multiple servers 628 may correspond to a plurality of sources of code banks, such as various open-source platforms. Embodiments are not limited in this context.

Figure 7:
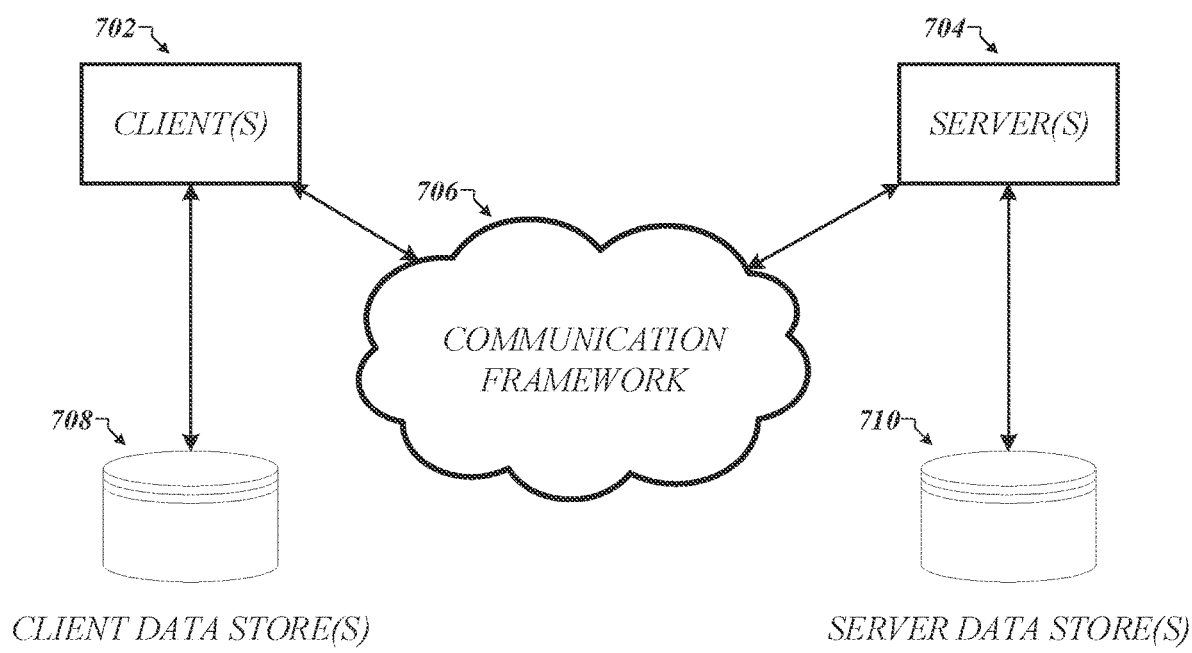
FIG. 7 is a block diagram depicting an exemplary communication architecture.

FIG. 7 illustrates a block diagram of an exemplary communications architecture 700 suitable for implementing various embodiments as previously described, such as virtual machine migration. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture 700 may include or implement one or more portions of components, applications, and/or techniques described herein. For example, a comment manager 204 may be implemented on one or more clients 702 and/or servers 704. The clients 702 and the servers 704 are operatively connected to one or more respective client data stores 708 and server data stores 710 that can be employed to store information local to the respective clients 702 and servers 704, such as cookies and/or associated contextual information. For example, a client data store 708 and/or a server data store 710 may be a library 213. In various embodiments, any one of servers 704 may implement one or more of logic flows or operations described herein in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various users or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Figure 8:
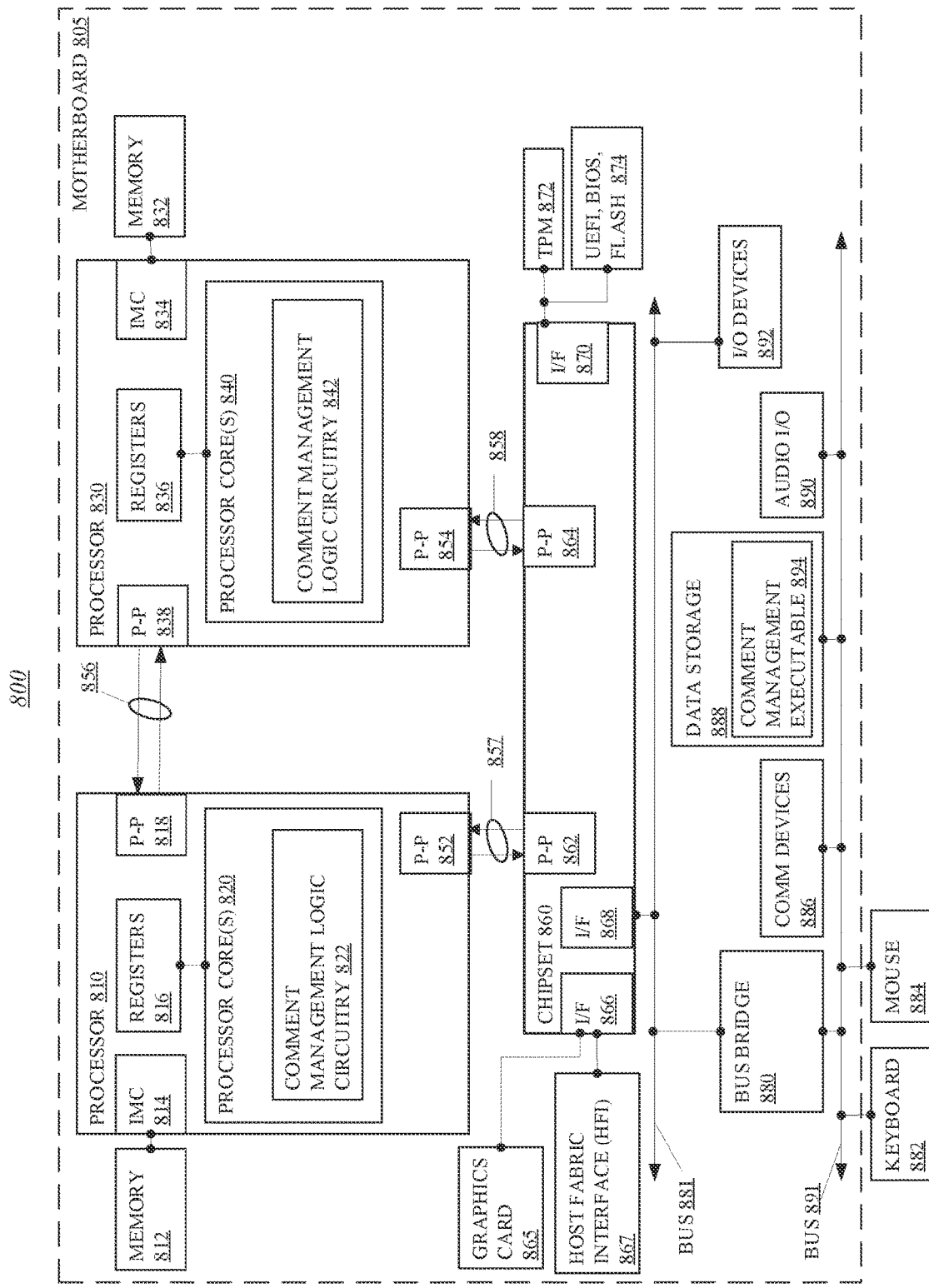

FIG. 8 illustrates an embodiment of a system 800 such as the client 702 in FIG. 7. The system 800 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, an external storage device, or the like. Further embodiments implement larger scale server configurations. In other embodiments, the system 800 may have a single processor with one core or more than one processor. Note that the term "processor" refers to a processor with a single core or a processor package with multiple processor cores.

As shown in FIG. 8, system 800 comprises a motherboard 805 for mounting platform components. The motherboard 805 is a point-to-point interconnect platform that includes a first processor 810 and a second processor 830 coupled via a point-to-point interconnect 856 such as an Ultra Path Interconnect (UPI). In other embodiments, the system 800 may be of another bus architecture, such as a multi-drop bus. Furthermore, each of processors 810 and 830 may be processor packages with multiple processor cores including processor core(s) 820 and 840, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 810 and the chipset 860. Some platforms may include additional components and some platforms may only include sockets to mount the processors and/or the chipset.

In some embodiments, the processor core(s) 820 and 842 may comprise comment management logic circuitry such as that described with respect to FIG. 2. The comment management logic circuitry may include logic circuitry configured to perform the operations described in conjunction with FIG. 4.

The first processor 810 includes an integrated memory controller (IMC) 814 and point-to-point (P-P) interfaces 818 and 852. Similarly, the second processor 830 includes an IMC 834 and P-P interfaces 838 and 854. The IMC's 814 and 834 couple the processors 810 and 830, respectively, to respective memories, a memory 812 and a memory 832. The memories 812 and 832 may be portions of the main memory (e.g., a dynamic random-access memory (DRAM)) for the platform (such as in data storage device 618 in FIG. 6) such as double data rate type 3 (DDR3) or type 4 (DDR4) synchronous DRAM (SDRAM). In the present embodiment, the memories 812 and 832 locally attach to the respective processors 810 and 830. In other embodiments, the main memory may couple with the processors via a bus and shared memory hub.

The processors 810 and 830 comprise caches coupled with each of the processor core(s) 820 and 840, respectively. In some embodiments, the processors 810 and 830 may be respectively coupled with registers 816 and 836. The first processor 810 couples to a chipset 860 via P-P interconnects 852 and 862 and the second processor 830 couples to a chipset 860 via P-P interconnects 854 and 864. Direct Media Interfaces (DMIs) 857 and 858 may couple the P-P interconnects 852 and 862 and the P-P interconnects 854 and 864, respectively. The DMI may be a high-speed interconnect that facilitates, e.g., eight Giga Transfers per second (GT/s) such as DMI 3.0. In other embodiments, the processors 810 and 830 may interconnect via a bus.

The chipset 860 may comprise a controller hub such as a platform controller hub (PCH). The chipset 860 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 860 may comprise more than one controller hub such as a chipset with a memory controller hub, a graphics controller hub, and an input/output (I/O) controller hub.

In the present embodiment, the chipset 860 couples with a trusted platform module (TPM) 872 and the Unified Extensible Firmware Interface (UEFI), BIOS, Flash component 874 via an interface (I/F) 870. The TPM 872 is a dedicated microcontroller designed to secure hardware by integrating cryptographic keys into devices. The UEFI, BIOS, Flash component 874 may provide pre-boot code.

Furthermore, chipset 860 includes an I/F 866 to couple chipset 860 with a high-performance graphics engine, graphics card 865 and a host fabric interface (HFI) 867. The I/F 866 may be, for example, a Peripheral Component Interconnect-enhanced (PCI-e). The HFI 867 may include a network interface to couple the system 800 with a connectivity fabric. The HFI 867 may be a network interface card (NIC) coupled with the system 800 or may comprise a portion of an integrated circuit of the chipset 860 or of a processor such as the processor 810 and/or the processor 830. The HFI 867 may interface the system 800 with other systems or storage devices via a connectivity fabric such as Fibre Channel or the like.

Various I/O devices 892 may couple to the bus 881, along with a bus bridge 880 which couples the bus 881 to a second bus 891 and an I/F 868 that connects the bus 881 with the chipset 860. In one embodiment, the second bus 891 may be a low pin count (LPC) bus. Various devices may couple to the second bus 891 including, for example, a keyboard 882, a mouse 884, communication devices 886, and a data storage unit 888 that may store code. Furthermore, an audio I/O 890 may couple to second bus 891. Many of the I/O devices 892, the communication devices 886, and the data storage unit 888 may reside on the motherboard 805 while the keyboard 882 and the mouse 884 may be add-on peripherals. In other embodiments, some or all the I/O devices 892, communication devices 886, and the data storage unit 888 are add-on peripherals and do not reside on the motherboard 805. In some embodiments, the data storage unit 888 may comprise a comment management executable 894 that can execute of a processor core such as the processor core(s) 820 and 840 to configure comment management logic circuitry 822 and/or 842.

Figure 9:
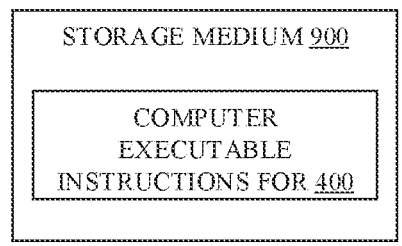
FIGS. 9-10 depict embodiments of a storage medium and a computing platform of embodiments described herein.

FIG. 9 illustrates an example of a storage medium 900 to store processor data structures. Storage medium 900 may comprise an article of manufacture. In some examples, storage medium 900 may include any non-transitory computer readable medium or machine-readable medium, such as an optical, magnetic or semiconductor storage. Storage medium 900 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 10:
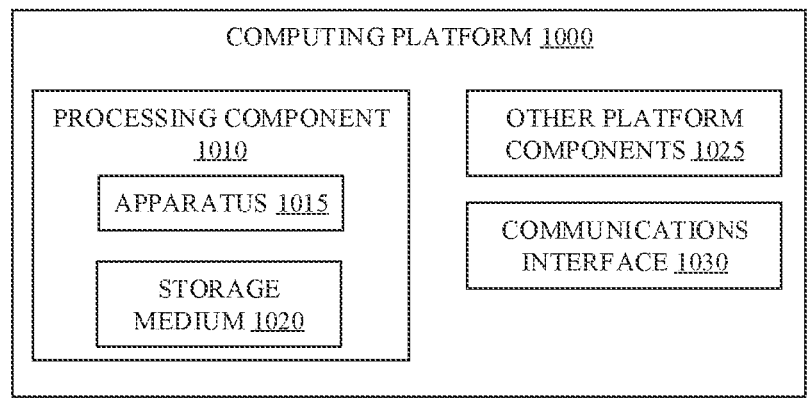

FIG. 10 illustrates an example computing platform 1000 such as the device of computing architecture 500 in FIG. 5, client 702 in FIG. 7, system 800 in FIG. 8. In some examples, as shown in FIG. 9, computing platform 1000 may include a processing component 1010, other platform components or a communications interface 1030. According to some examples, computing platform 1000 may be a computing device such as a server in a system such as a data center or server farm that supports a manager or controller for managing configurable computing resources as mentioned above. Furthermore, the communications interface 1030 may comprise a wake-up radio (WUR) and may be capable of waking up a main radio of the computing platform 1000.

According to some examples, processing component 1010 may execute processing operations or logic for apparatus 1015 described herein. Processing component 1010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 1020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In some embodiments, a storage medium 1020 may have one or more aspects in common with a storage medium 900. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 1025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1030 may include logic and/or features to support a communication interface. For these examples, communications interface 1030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 1000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 1000 may include or exclude functions and/or specific configurations of the computing platform 1000 described herein.

The components and features of computing platform 1000 may comprise any combination of discrete circuitry, ASICs, logic gates and/or single chip architectures. Further, the features of computing platform 1000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Processing circuitry, logic circuitry, devices, and interfaces herein described may perform functions and/or store code and/or data to perform functions to implement entirely in hardware and/or entirely or partially with code executed on one or more processors. Processing circuitry, or logic circuitry, refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits or circuitry to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

What is claimed is:
1. A computer-implemented method comprising:
obtaining training program code containing associated comments;
identifying a training code segment in the training program code, the training code segment corresponding with one or more of the associated comments;
compiling the training code segment to generate an intermediate code segment, the intermediate code segment at an intermediate stage of compilation between the training program code and a compiled code;
identifying one or more comment recommendations based on the intermediate code segment; and soliciting user instructions for the one or more comment recommendations.

2. The computer-implemented method of claim 1 comprising:
when the one or more comment recommendations relates to a substantive update, soliciting the user instructions for the one or more comment recommendations.

3. The computer-implemented method of claim 2 comprising:
when the one or more comment recommendations relates to a non-substantive or bibliographic update to the intermediate code segment, updating one of the associated comments.

4. The computer-implemented method of claim 3 wherein the one of the associated comments includes a header comment.

5. The computer-implemented method of claim 1 wherein the one or more comment recommendations is to update one of the associated comments.

6. The computer-implemented method of claim 1 wherein the one or more comment recommendations is to insert a new comment.

7. The computer-implemented method of claim 1 wherein the one or more comment recommendations is to delete one of the associated comments.

8. The computer-implemented method of claim 1 further comprising:
responsive to the user instructions, identifying an alternative option to the one or more comment recommendations.

9. An apparatus comprising:
memory; and
logic circuitry coupled with the memory to:
obtain training program code containing associated comments;
identify a training code segment in the training program code, the training code segment corresponding with one or more of the associated comments;
compile the training code segment to generate an intermediate code segment, the intermediate code segment at an intermediate stage of compilation between the training program code and a compiled code; and
identify one or more comment recommendations based on the intermediate code segment.

10. The apparatus of claim 9, the logic circuitry to:
when the one or more comment recommendations relates to a substantive update, solicit user instructions for the one or more comment recommendations.

11. The apparatus of claim 9, the logic circuitry to:
when the one or more comment recommendations relates to a non-substantive or bibliographic update to the intermediate code segment, update one of the associated comments.

12. The apparatus of claim 11 wherein the one of the associated comments includes a header comment.

13. The apparatus of claim 9 wherein the one or more comment recommendations is to update one of the associated comments.

14. The apparatus of claim 9 wherein the one or more comment recommendations is to insert a new comment.

15. The apparatus of claim 9 wherein the one or more comment recommendations is to delete one of the associated comments.

16. The apparatus of claim 9, the logic circuitry to:
responsive to user instructions, identify an alternative option to the one or more comment recommendations.

17. A non-transitory computer-readable medium comprising instructions that, when executed by a processor, cause the processor to:
identify a training code segment in training program code, the training code segment corresponding with one or more associated comments;
compile the training code segment to generate an intermediate code segment, the intermediate code segment at an intermediate stage of compilation between the training program code and a compiled code;
identify one or more comment recommendations based on the intermediate code segment; and
solicit user instructions for the one or more comment recommendations.

18. The non-transitory computer-readable medium of claim 17, wherein when the one or more comment recommendations relates to a substantive update, the instructions further cause the processor to solicit the user instructions for the one or more comment recommendations.

19. The non-transitory computer-readable medium of claim 18, wherein when the one or more comment recommendations relates to a non-substantive or bibliographic update to the intermediate code segment, the instructions further cause the processor to update one of the associated comments.

20. The non-transitory computer-readable medium of claim 17, wherein responsive to the user instructions, the instructions further cause the processor to identify an alternative option to the one or more comment recommendations.

* * * * *